June 1, 1965 E. GSCHWANDTNER 3,187,102
STEREO MULTIPLEX RECEIVER WITH AUTOMATIC STEREO OR MONAURAL DETECTION AND INDICATING MEANS
Filed Feb. 21, 1963
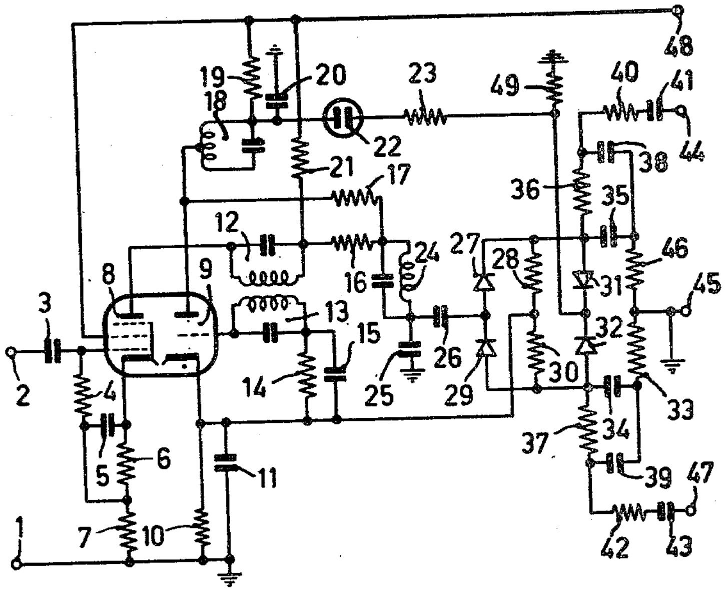
INVENTOR.
ERICH GSCHWANDTNER
BY
Frank R. Trifari
AGENT

United States Patent Office 3,187,102
Patented June 1, 1965

3,187,102

STEREO MULTIPLEX RECEIVER WITH AUTOMATIC STEREO OR MONAURAL DETECTION AND INDICATING MEANS

Erich Gschwandtner, Agincourt, Ontario, Canada, assignor to North American Philips Company, Inc., New York, N.Y., a corporation of Delaware Filed Feb. 21, 1963, Ser. No. 260,125
Claims priority, application Canada, Feb. 22, 1962, 842,905
6 Claims. (Cl. 179—15)

This invention relates to sound multiplex systems of transmission and reception and more particularly to a demodulation circuit for use in receivers adapted for the reception of a frequency modulation carrier when the sound signals A and B, representing the stereophonic sound sources, are transmitted in the form of sum $(A+B)$ and difference $(A-B)$ signals.

In a system now approved for use in Canada and the United States, a carrier is frequency modulated by a combination of the $A+B$ signal and sidebands of a sub-carrier amplitude modulated by the $A-B$ signals. The sub-carrier presently in use is at a frequency of 38 kilocycles and since the carrier is suppressed in transmission, a pilot signal of 19 kilocycles is transmitted on the same frequency modulated carrier for use in reinsertion of a 38 kilocycle carrier at the receiver. The pilot signal of 19 kcs. modulates the carrier in frequency by 10% or ±7.5 kcs. considering 100% modulation to be ±75 kcs. The remaining 90% of the allowable modulation is used for the transmission of the $A+B$ and $A-B$ stereophonic signals and in some instances, in addition, a subsidiary communication in the form of a sub-carrier between 53 and 75 kcs. Pre-emphasis of the higher modulation frequencies is used in the normal manner.

The radio frequency signal transmitted therefore, insofar as we are presently concerned, may be modulated by the following signals in the noted frequency bands:

$A+B$ in the band 0–15 kcs.
$A-B$ in the form ± (0–15) kcs. sidebands of 38 kcs. sub-carrier with carrier suppressed giving a range of 23–53 kcs.
A pilot signal at 19 kcs.
A subsidiary carrier in the 53–75 kcs. band.
An audio signal (monaural broadcast) for instance in the range of 0–20 kcs. A subsidiary carrier may also be included in monaural broadcasts.

In a frequency modulation receiver for use with the above types of modulation provision must be made, in the case of stereophonic reception, for the demodulation of the $A+B$ and $A-B$ and the recombination or matrixing thereof for production of the A and B signals separately.

In the case of monaural transmission provision must be made for detection of the normal audio modulation signal.

It is, therefore, an object of the present invention to provide a demodulation system which provides the A and B stereophonic signals from $A+B$ and $A-B$ signals transmitted in the approved manner.

It is a further object of this invention to provide a stereophonic frequency demodulation system which is simple and reliable.

It is a still further object of this invention to provide a system which will automatically adjust itself to the reception of monaural or stereophonic signals and also provide an indication of its adjustment, this being accomplished without the use of relays.

Other objects and advantages will appear in the following description of the invention made with reference to the single figure of the drawing which shows a preferred embodiment thereof.

The circuit shown is adapted to have supplied to the input terminals 1, 2 thereof the modulation frequencies derived from a received stereophonic or monaural radio frequency modulated broadcast signal. The modulation frequency signal input terminal 2 is coupled to the control grid of pentode amplifying tube 8 by means of a capacitor 3 and a resistor 4. The parallel combination of capacitor 5 and resistor 6 in the cathode circuit of tube 8 are selected to give a 4 db increase in response or gain of tube 8 above 19 kcs. and the crossover is at this frequency. Resistor 7 is a cathode resistor supplying some negative feedback. The source of voltage supply for the circuit is between ground, i.e. terminal (negative) and terminal 48 (positive) which is directly connected to the screen grid of tube 8.

The anode of tube 8 is connected through a circuit 12, parallel resonant at 19 kcs., and a resistor 21 to terminal 48. Resonant circuit 12 is magnetically coupled to a further circuit 13, also parallel resonant at 19 kcs., which feed the amplified 19 kcs. modulation signal to the control grid of a triode and amplifying tube 9 provided with a cathode load circuit comprising resistor 10 and capacitor 11 and a grid leak bias arrangement comprising resistor 14 and capacitor 15. The anode of tube 9 is connected to a tap on the coil of a tuned circuit 18 parallel resonant at 38 kcs., i.e., the suppressed sub-carrier frequency. A resistor 19 and a decoupling capacitor 20 are inserted between positive terminal 48 and circuit 18.

The amplified voltages produced across resistor 21 and circuit 18 are supplied through resistor 16 and 17 respectively to a circuit 24 parallel resonant to a frequency of, for instance, 67 kcs. which is assumed to be the frequency of the subsidiary communication carrier present in the modulation signal. This carrier, as noted earlier, may be anywhere between 53 and 75 kcs.

Parallel tuned circuit 24 is connected by way of a capacitor 25 to ground or *b* minus. A capacitor 26 is connected between the junction of circuit 24 and capacitor 25 and the common point of two diodes 27, 29 connected in series aiding relationship. A pair of resistors 28, 30 and a pair of diodes 31, 32, connected in series current opposition, shunt diodes 27, 29. The junction point of resistors 28, 30 is directly connected to the cathode of tube 9. The junction of diodes 31, 32 is connected to ground by way of a resistor 49 and to the junction of tuned circuit 18 and resistor 19 by way of a resistor 23 and a gas discharge tube 22, preferably of the glow type.

Resistor 36 and capacitors 35, 38, likewise resistor 37 and capacitors 34, 39 are audio frequency de-emphasis networks for the audio output signals which are supplied to output terminals 44, 47 by way of resistor 40, capacitor 41 and resistor 42 and capacitor 43 respectively. Resistors 46, 33 in conjunction with their associated de-emphasis networks from Wien bridge type networks which are effective to remove the difference channel sub-carrier, i.e., 38 kcs.

The operation of the circuit will now be described with reference to the demodulation and production of stereophonic audio signals from a stereophonic broadcast, it being assumed that the signal being supplied between terminals 1 and 2 is taken from a properly adjusted demodulation circuit. Whether the demodulation signal is derived from a frequency, amplitude or other type of modulation wave is of no importance insofar as the operation of the circuit of the invention is concerned.

The signal applied between terminals 1 and 2 is amplified in tube 8 with an increased response above 19 kcs. produced by capacitor 5 and resistor 6. The 19 kcs. pilot signal is developed across tuned circuit 12, coupled to tuned circuit 13 and applied to tube 9 which, due to the grid leak bias arrangement 14, 15, acts in class C and produces, with the aid of tuned circuit 18, an output at 38 kcs. which is supplied by way of resistor 17, tuned circuit 24 and capacitors 25, 26 to the junction of diodes 27, 29.

The modulation frequencies of the applied signal, other than the 19 kcs. pilot signal, amplified in tube 8 are developed across resistor 21 and supplied by way of resistor 16, tuned circuit 24, and capacitors 25, 26 to the junction of diodes 27, 29. If there is a subsidiary sub-carrier present in the signal produced across 21 it is removed from the junction of diodes 27, 29 by tuned circuit 24.

Since we are considering a stereophonic signal is being supplied, the bias produced on the control grid of tube 9, by grid leak 14, 15, will be substantial and the anode current relatively small. The voltage at the junction of resistor 19 and circuit 18 will be high and of a value such as to igntie gas discharge tube 22, the current through which develops a positive voltage across resistor 49 which voltage is sufficient to back bias diodes 31, 32 and in effect render them open circuits. As a consequence they the not a part of the operative circuit in the reproduction of the stereophonic audio signals. Since tube 22 is ignited the glow produced thereby may be used as an indication that a stereophonic signal pilot carrier is being received. Although a positive voltage is applied to the junction of resistors 28, 30 from the cathode of tube 9, this voltage is insufficient, due to the small current of this tube when the sub-carrier pilot signal is being amplified, to override the positive blocking bias provided at the junction of diodes 31, 32.

Considering now the action of diodes 27, 29 which act as opposed rectifiers, the signal voltages applied thereto comprise an $(A+B)$ signal in the range of 0–15 kcs. and in effect an amplitude modulated sub-carrier of 38 kcs. with $(A-B)$ sideband frequencies between 23 and 53 kcs. We can consider that the diodes 27, 29 are alternately switched to a state of conduction by the 38 kcs. carrier so that the $A-B$ signal is demodified to produce a positive $(A-B)$ signal across resistor 28 and a negative $(A-B)$ signal across resistor 30 so that the resultant signal across resistor 28 is $(A+B)+(A-B)=2A$ while the resultant signal across resistor 30 is $(A+B)-(A-B)=2B$.

Thus, after de-emphasis provided by network 36, 35, 38 the audio signal representing channel A of the original stereophonic signal appears between terminals 44, 45 while similarly the channel B signal appears between terminals 45, 47. The A and B signals may be then applied to audio reproducing devices to produce a sound space distribution representing the original program being broadcast. The 38 kcs. components are removed by the de-emphasis networks in conjunction with resistors 46, 33 as noted above.

A further explanation of the operation of the switched rectifier system for use with stereophonic signal reproduction is provided in our U.S. Patent No. 3,087,994 to Schutte, filed March 21, 1960.

Considering now the case when a monaural signal is being received, the 19 kcs. carrier is not present in the signal fed to terminals 1, 2. As a consequence tube 9 will be conducting heavily, since no grid leak bias is produced, and the voltage across gas discharge tube 22 is low and the tube extinguishes, thus removing the blocking bias from diodes 31, 32. Simultaneously the cathode potential of tube 9 rises to provide a high forward bias on diodes 31, 32 the common junction of which is essentially at ground potential. These diodes present effectively a short circuit across diodes 27, 29 so that the monaural signal, amplified by tube 8, is applied equally to both audio reproducers. The extinguished gas discharge tube, when and preferably of glow discharge type, indicates that a monaural signal is being received.

Another possible mode of operation is that in which a monaural signal is being transmitted by a stereophonic transmitter. The operation of the circuit will be identical with that taking place in the reception of stereophonic signals with the exception that no difference signal is present since none is transmitted. As a consequence the monaural signal will be produced by each reproducer and the gas discharge tube indicator will indicate the presence of the 19 kcs. pilot signal.

It will now be apparent that a sum $(A+B)$ and difference $(A-B)$ signal demodulator which performs the matrixing simultaneously with the detection of the difference signal has been provided. Further, a system has been described which provides automatic switching of the circuit adapted for stereophonic signal reception to one adapted for monaural reception. In addition, a system has been provided which indicates whether or not the stereophonic sub-carrier is present in a received signal.

What is claimed is:

1. A system for producing A and B audio frequency signals from a composite signal constituted by an $(A+B)$ signal, a pilot signal, and the sideband frequencies of a supersonic carrier of a frequency harmonically related to said pilot signal and suppressed carrier amplitude modulated by an $(A-B)$ signal, comprising; means for amplifying said pilot signal and altering its frequency to correspond to the said supersonic carrier frequency, means for applying the produced supersonic carrier, the $(A+B)$ and the $(A-B)$ sideband frequencies signals to the common junction of two unilaterally conducting devices connected in series aiding sense, a pair of serially-connected load circuits connected across the non-common terminals of said unilaterally conducting devices, means connecting the common junction of the load circuits to a source of reference potential, switch means shunting said unilaterally conducting devices, and means responsive to the pilot signal for opening the switch when the pilot signal attains a predetermined minimum value to produce the A signal across one of the load circuits and the B signal across the other and for closing said switch to short-circuit the non-common terminals of the series aiding unilaterally conducting devices when the pilot signal falls below a predetermined value to connect both circuits in parallel to produce the same signal in each half.

2. The system as claimed in claim 1, wherein a voltage representative of the amplitude of said pilot signal is applied to a gas discharge indicator tube which ignites when said pilot signal amplitude is greater than a predetermined minimum.

3. The system as claimed in claim 1 wherein said source of reference potential varies inversely with respect to the amplitude of said pilot signal.

4. A system for producing A and B audio frequency signals from a composite signal constituted by an $A+B$ signal, a pilot signal, and the sideband frequencies of an amplitude modulated supersonic carrier of a frequency harmonically related to said pilot signal and suppressed carrier amplitude modulated by an $A-B$ signal comprising a first amplifier operative to amplify all said signals and having an increased response for said sideband signals, means selecting the amplified pilot signal and supplying it to a further amplifier having a non-linear amplifying characteristic and an output circuit tuned to the frequency of said suppressed carrier, means supplying the amplified $A+B$, $A-B$ sideband modulation signals and the output of said further amplifier to the common junction of a pair of unilaterally conductive devices connected in series like current carrying sense, a pair of serially connected resistors connected between the non-common terminals of said devices and having their common junction connected to a source of voltage which varies inversely with respect to the amplitude of said pilot signal, a further pair of unilaterally conductive devices connected in series current opposition between said non-common terminals, a gas discharge tube connected between a source of potential, which increases directly with the amplitude of said pilot signal, and the common junction of said further devices, resistor means connecting said last-mentioned junction to a source of reference potential and wherein the said gas discharge tube is in a state of current conduction when said pilot signal is greater than a predetermined minimum amplitude and the voltage developed across said resistor means by said conduction blocks said further devices against current conduction.

5. A system for producing A and B frequency signals from a composite signal constituted by an $(A+B)$ signal, a pilot signal, and the sideband frequencies of a supersonic carrier of a frequency harmonically related to said pilot signal and suppressed carrier amplitude modulated by an $(A-B)$ signal comprising; an amplifier selective to said pilot signal and having a non-linear output versus input characteristic, the output circuit of said amplifier being resonant at the frequency of said supersonic carrier, means applying said $(A+B)$ signal, the sideband frequencies produced by the $(A-B)$ signal modulation of the carrier, and the amplifier output to the common junction of a first pair of unilaterally conducting devices connected in series aiding relationship, a pair of serially-connected load resistors shunting said series-connected devices, a second pair of unilaterally conducting devices connected in series-opposing relationship shunting said first pair of devices, and means responsive to the pilot signal for applying first and second predetermined potentials to the common junctions of the load resistors and second pair of devices to reverse bias said second pair of devices when the pilot signal exceeds a predetermined minimum value whereby the A signal is produced across one load resistor and the B signal across the other and third and fourth predetermined potentials to the common junctions of the load resistors and second pair of devices to forward bias said second pair of devices when the pilot signal falls below a predetermined minimum value whereby said load resistors are connected in parallel and each provides the same signal.

6. The system as claimed in claim 5, wherein a voltage representative of said pilot signal is applied to a gas discharge tube which ignites when said pilot signal is greater than a predetermined minimum value.

References Cited by the Examiner

UNITED STATES PATENTS

| | | | |
|---|---|---|---|
| 3,070,662 | 12/62 | Eilers | 179—15 |
| 3,087,994 | 4/63 | Schutte | 179—15 |

OTHER REFERENCES

Knight and Beckman: "Design Considerations in the Development of High Quality Stereo Multiplex Receivers," IRE Transactions on Broadcast and Television Receivers, November 1961, pp. 40–44.

Snitzer: "Stereo FM Multiplex Adapter Circuits," Electronics World, October 1961, pages 40 and 41 relied on.

DAVID G. REDINBAUGH, *Primary Examiner.*